US012748376B1

(12) United States Patent
O'Connell et al.

(10) Patent No.: US 12,748,376 B1
(45) Date of Patent: Sep. 29, 2026

(54) RADIO FREQUENCY COLOR HOLOGRAPHIC QUICK RESPONSE

(71) Applicant: HNU Photonics LLC, Kahului, HI (US)

(72) Inventors: Daniel G. O'Connell, Kihei, HI (US); Riley Aumiller, Kihei, HI (US); James F. Scholl, Tucson, AZ (US)

(73) Assignee: HNU PHOTONICS LLC, Kahului, HI (US)

( * ) Notice: Subject to any disclaimer, the term of this patent is extended or adjusted under 35 U.S.C. 154(b) by 0 days.

(21) Appl. No.: 18/464,501

(22) Filed: Sep. 11, 2023

Related U.S. Application Data

(63) Continuation of application No. 16/812,597, filed on Mar. 9, 2020, now abandoned, and a continuation of application No. 16/359,416, filed on Mar. 20, 2019, now Pat. No. 10,885,413.

(60) Provisional application No. 62/815,436, filed on Mar. 8, 2019, provisional application No. 62/740,590, filed on Oct. 3, 2018, provisional application No. 62/645,319, filed on Mar. 20, 2018.

(51) Int. Cl.
*G03H 1/00* (2006.01)
*G03H 1/22* (2006.01)
*G06K 19/16* (2006.01)
*G09F 3/00* (2006.01)

(52) U.S. Cl.
CPC ......... *G03H 1/0005* (2013.01); *G03H 1/2249* (2013.01); *G06K 19/16* (2013.01); *G09F 3/0292* (2013.01)

(58) Field of Classification Search
CPC ....... G06K 19/06037; G06K 19/06065; G06K 19/0614
See application file for complete search history.

(56) References Cited

U.S. PATENT DOCUMENTS

| | | | | |
|---|---|---|---|---|
| 8,823,494 | B1 * | 9/2014 | Kovitz | H04W 12/50 398/128 |
| 10,022,614 | B1 * | 7/2018 | Tran | G16H 50/20 |
| 2006/0118229 | A1 | 6/2006 | Ohashi et al. | |
| 2015/0074015 | A1 * | 3/2015 | Stein | G06Q 30/0185 705/343 |
| 2016/0171202 | A1 * | 6/2016 | Goad | H04W 4/80 726/5 |
| 2018/0042091 | A1 * | 2/2018 | De Menezes | H05B 47/19 |
| 2018/0096292 | A1 * | 4/2018 | DeBusk | G16H 10/60 |
| 2018/0101945 | A1 * | 4/2018 | Stone | G06V 20/95 |
| 2018/0118337 | A1 * | 5/2018 | Viel | G05D 1/0088 |
| 2018/0189784 | A1 * | 7/2018 | Grabowski | G06F 21/31 |
| 2018/0205714 | A1 * | 7/2018 | Rosati | H04L 63/0428 |

(Continued)

FOREIGN PATENT DOCUMENTS

| | | | |
|---|---|---|---|
| CA | 3047645 | A1 | 6/2018 |
| CN | 108182654 | * | 12/2017 |

*Primary Examiner* — Thien M Le
(74) *Attorney, Agent, or Firm* — Cermak & McGowan LLP; Malcolm K. McGowan

(57) ABSTRACT

Labels have visible color holographic quick response 9CHQR) faces and hidden coded radio frequency (RF) antennas on their rear surfaces. RF coding provides evidence of tampering and adds active bi-directional flow of information between the label and label readers. RFCHQR labels provide authentication and update information in memory slots.

17 Claims, 4 Drawing Sheets

(56) References Cited

U.S. PATENT DOCUMENTS

| | | | | |
|---|---|---|---|---|
| 2018/0264347 | A1* | 9/2018 | Tran | G06V 40/28 |
| 2019/0334730 | A1 | 10/2019 | Endress et al. | |

* cited by examiner

Differential CHQR – Another approach

- As an added layer of security, we can scramble the CHQR pixels at each supply chain step, especially at the origin, where the transformation is invertible and stored on the RFID.

- The palette for this sorted data set can be further transformed into a curve in some other color space e.g. a cylindrical one

Differential CHQR – Another approach

- The color palette is changed at each supply chain by an invertible transformation. This transformation at each supply chain step is encrypted on the RFID

RADIO FREQUENCY COLOR HOLOGRAPHIC QUICK RESPONSE

This application claims the benefit of U.S. Provisional Application No. 62/815,436 filed Mar. 8, 2019, and of U.S. application Ser. No. 16/359,415, filed Mar. 20, 2019, now U.S. Pat. No. 10,885,413, which claims priority from U.S. Provisional Application 62/740,590, filed Oct. 3, 2018, and U.S. Provisional Application 62/645,318, filed Mar. 20, 2018. The contents of these applications are hereby incorporated by reference in their entirety as if fully set forth herein.

SUMMARY OF THE INVENTION

As visible Color Holographic Quick Response (CHQR) labels encode information based on unique spatial and spectral properties of the label. The addition of Radio Frequency (RF) components in a RFCHQR label add the following capabilities: additional means of identification (ID), additional encoding of information, and evidence of tampering via the labels unique RF signature.

The RF signature can be combinations of spatial, spectral and temporal operations. RFCHQR labels add an active capability that allows for bidirectional flow of information between the label and the label reader.

Radio frequency components inside the label can be more advanced than standard approaches. It is possible for the RF link to be active, such as pairing a Bluetooth connection for authentication.

A specialized RFCHQR smart device is able to pair with the label, provide authentication and update information on subsequent label memory slots.

Information on the RFCHQR can be updated as it progresses in the supply chain, unlike a standard printed label with the following additional properties:

In RF, the information can be encrypted. RF provides a check mechanism on the validity of the information in the label. RF can detect if information has been tampered with (and where). RF functions as a ledger of each processing step and records timestamp, GPS coordinates, authorized user ID's, among other things.

A new RFCHQR label provides cradle to grave information about an entire system, its subsystems and individual components. For example, such labels can be incorporated into question and answer (QA) routines during manufacturing of crucial items, embedding information such as test results, time of test and other details.

Digital authentication features and cryptographic services are easily utilized to insure these new features.

RFID tags have been added to CHQR labels.

In addition the RFID may consist of a planar array of RF antennas within the label providing spatial and temporal multi-plexing data transmit and receive capability and authentication similar in nature to the holographically encoded optical based Color Holographic CHQR Label.

These and further and other objects and features of the invention are apparent in the disclosure, which includes the above and ongoing written specification, with the claims and the drawings.

DETAILED DESCRIPTION

Figure 1:
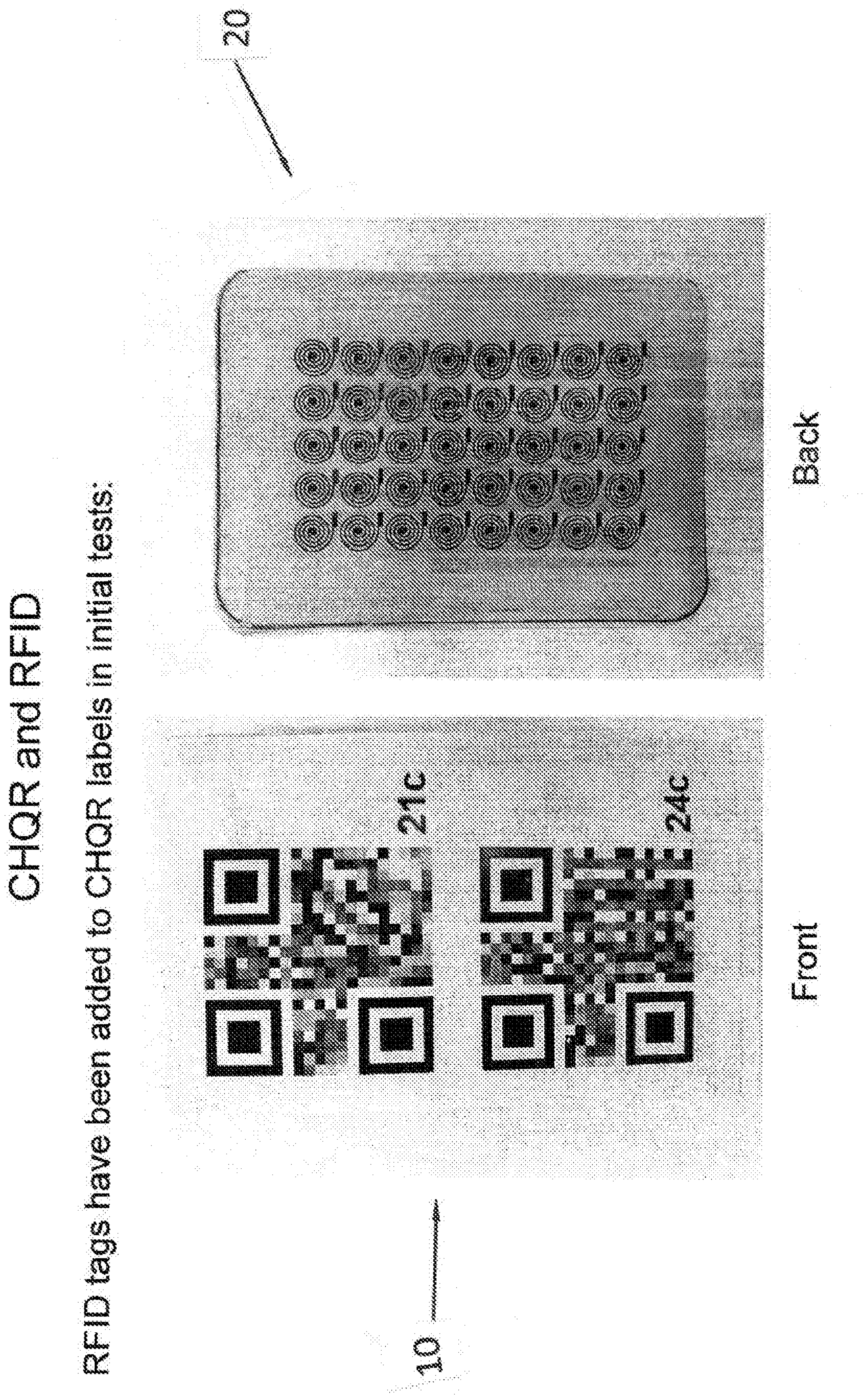
FIG. 1 shows a CHQR label with a planar array of RF tuned antennas on the back of the label.

FIG. 1 shows a CHQR label 10 with a planar array of RFID tags 20 on the back of the label.

As regards specific antenna designs there are several possible designs.

Mono-statics utilize one antenna for both transmission and reception.

Bi-static uses separate antennas for transmission and reception.

High gain directional antennas, lower gain omnidirectional antennas, or both may be used.

Antennas and RF systems could be assembled in a vertically stacked configuration on the label.

Planar array of RF antenna systems may be used on the label. FIG. 1 shows an example.

However, a possible problem arises due to singulation, in which if multiple tags respond to a single query they may jam each other. This could contribute to a unique RF signature.

A singulation protocol or an anti-collision protocol is implemented in order to be able to access information from each RF component separately.

Interactive CHQR labels use available technology. The technology is available for CHQR to be implemented on.

The materials here are specifically adapted for CHQR e-labels and are programmable. The labels could be completely digital with the following advantages:

Up to 24-bit layers (8 in each R, G, B channel) can be utilized with full recovery.

The increase in data capacity enables block-chaining.

16 bit per channels provide more authentication features along with more data.

Differential CHQR uses both RFID interactive labels. Interactive labels can use all possible bit layers. This would be implemented for highest valued items such as DOD equipment, parts. At each step in product chain, the CHQR code is changed to accommodate new information. This added information can either be a black and white (B/W) QR code or another colored CHQR. Authentication is added at each step in the chain. Effectively this can become a block-chain. If authentication is not verified at each and every step, CHQR fails. Form and storage of this information is being generated. There can be a number of approaches to this.

FIG. 1 shows a CHQR label 10 with RF tuned antennas k20 on the back of the label.

Figure 2:
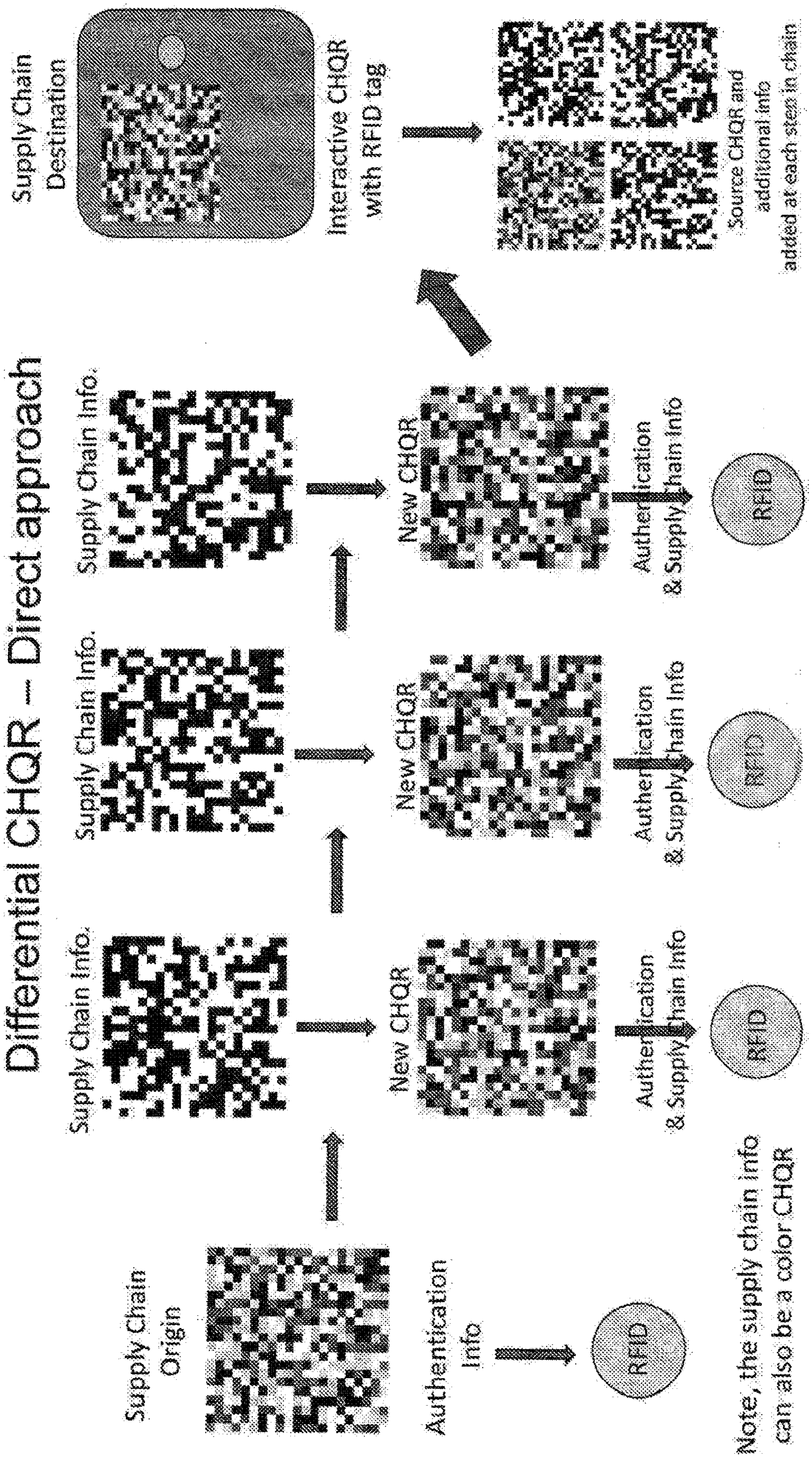
FIGS. 2-4 schematically show the application of RFCHQR in supply chain authentication.
Figure 3:
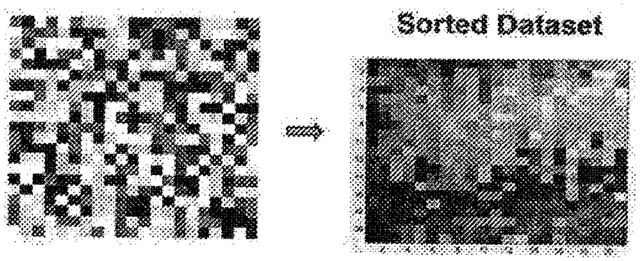
Figure 3:
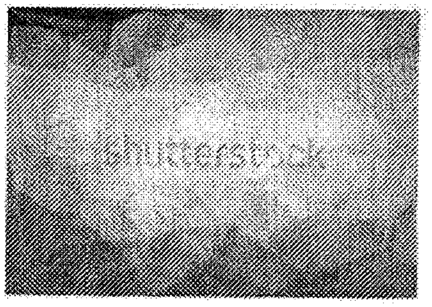
Figure 3:
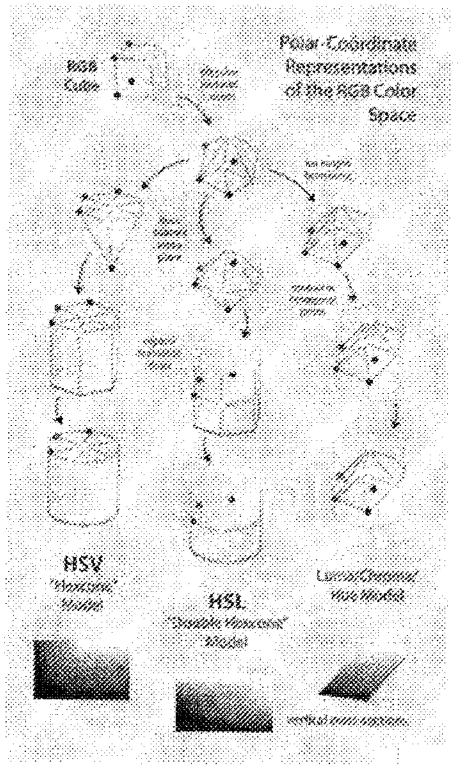
Figure 4:
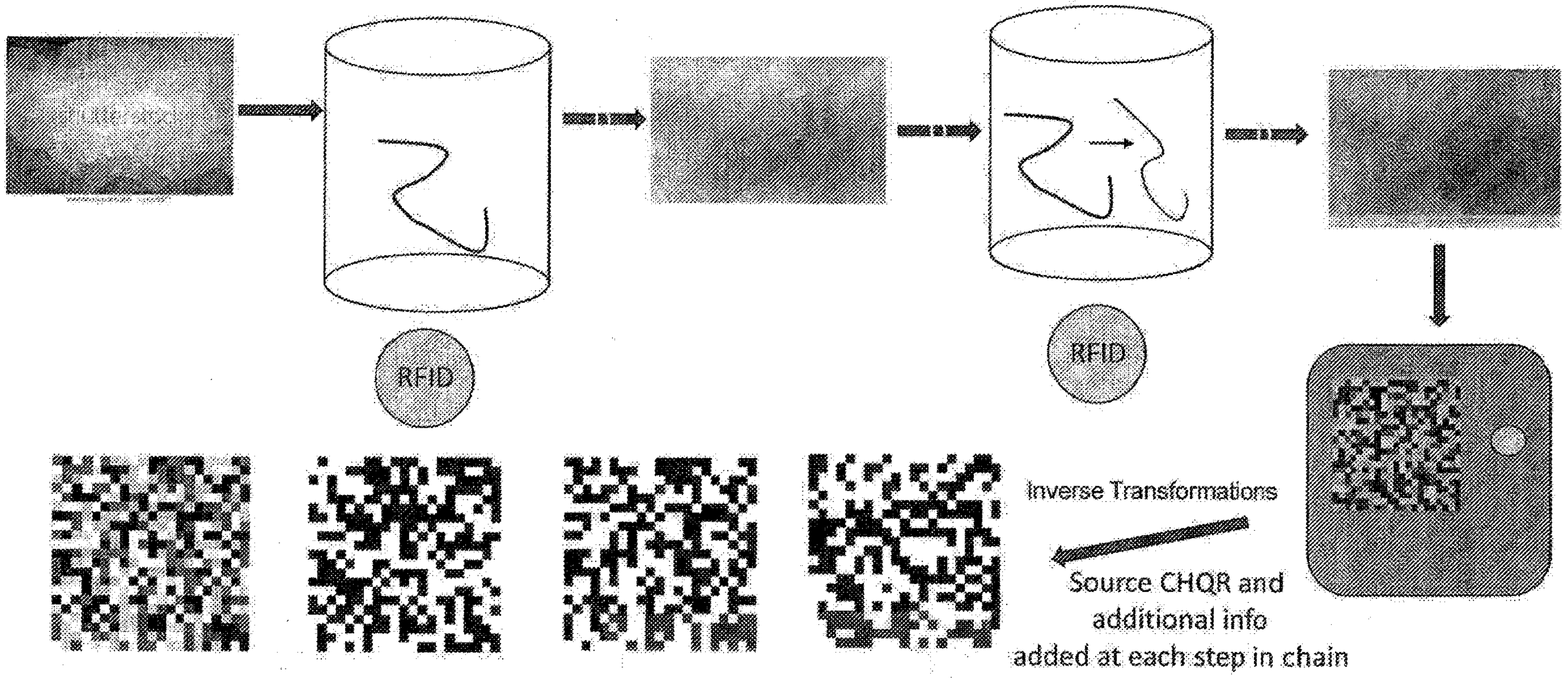

FIGS. 2-4 schematically show the application of RFCHQR in supply chain authentication.

FIGS. 2-4 schematically show the application of RFCHQR in supply chain authentication. All 8 or 16 bit layers for each channel are used. For simplicity FIGS. 2-4 show 1 bit layer per channel.

As an added layer of security, the CHQR pixels are scrambled at each supply chain step, especially at the origin, where the transformation is invertible and stored on the RFID.

The palette for this sorted data can be further transformed into a curve in some other color space, e.g. a cylindrical one.

The color palette is changed at each supply chain by an invertible transformation. This transformation at each supply chain step is encrypted on the RFID.

While the invention has been described with reference to specific embodiments, modifications and variations of the invention may be constructed without departing from the scope of the invention, which is defined in the following claims.

We claim:

1. Apparatus comprising a label having a color holographic quick response code and a radio frequency antenna; wherein the radio frequency antenna is connected to a radio frequency transceiver located on or within the label; and wherein the label is configured to store information transmitted from optical and/or radio frequency devices, which information can be read from the label by said devices;

said information can be encrypted, and can be used to securely verify the authenticity of the process.

2. The apparatus of claim 1, wherein the color holographic quick response code is on a face of the label and the radio frequency antenna is on a back of the label.

3. The apparatus of claim 2, wherein plural different color holographic quick responses codes are on the face of the label.

4. The apparatus of claim 2, wherein plural distinct antennas are positioned on a back of the label.

5. The apparatus of claim 4, wherein plural distinct antennas are connected with the label.

6. The apparatus of claim 4, wherein the plural distinct antennas are radio frequency identification antennas.

7. The apparatus of claim 6, wherein the plural radio frequency identification antennas have different combinations of spatial, spectral and temporal operation.

8. The apparatus of claim 1, wherein the code color palette of the color holographic quick response code is changeable.

9. The apparatus of claim 8, wherein the color palette of the color holographic quick response code is changeable by an invertible transformation.

10. The apparatus of claim 9, wherein the invertible transformation is encrypted on RFID, Radio Frequency Identification in the RF antennas.

11. The apparatus of claim 1, comprising a label having a color holographic quick response code and a radio frequency antenna; wherein the label is configured to be actively linked to the optical and/or radio frequency devices.

12. The apparatus of claim 11, wherein the label is configured to be actively linked to the optical and/or radio frequency devices via Bluetooth.

13. A method for interactively tracking, monitoring, storing, and/or verifying changes made to a product during a manufacturing process, the method comprising providing a visible color holographic quick response label with a radio frequency antenna connected to the label, wherein the label is configured to store information transmitted from optical and/or radio frequency devices, which information can be read from the label by said devices;

said information can be encrypted, and can be used to securely verify the authenticity of the process.

14. The method of claim 13, further comprising the possible wherein the color holographic quick response labels are provided with color palettes of quick response codes with inverse transformations controlled by the radio frequency antennas connected to the labels.

15. The method of claim 14, further comprising providing pixels of the color holographic quick response code with pixels which are transformable and invertible stored in the radio frequency identification.

16. The method of claim 14, further comprising storing pixel transformation information in radio frequency identification activated by signals from radio frequency antennas.

17. The method of claim 14, further comprising changing color palettes at each supply chain by invertible transformation controlled at each supply chain by encrypted radio frequency identification and individual radio frequency antennas.

* * * * *